No. 825,531. PATENTED JULY 10, 1906.
G. E. FRANQUIST.
CONTROLLER FOR MOTOR VEHICLES.
APPLICATION FILED MAY 26, 1905.
4 SHEETS—SHEET 1.
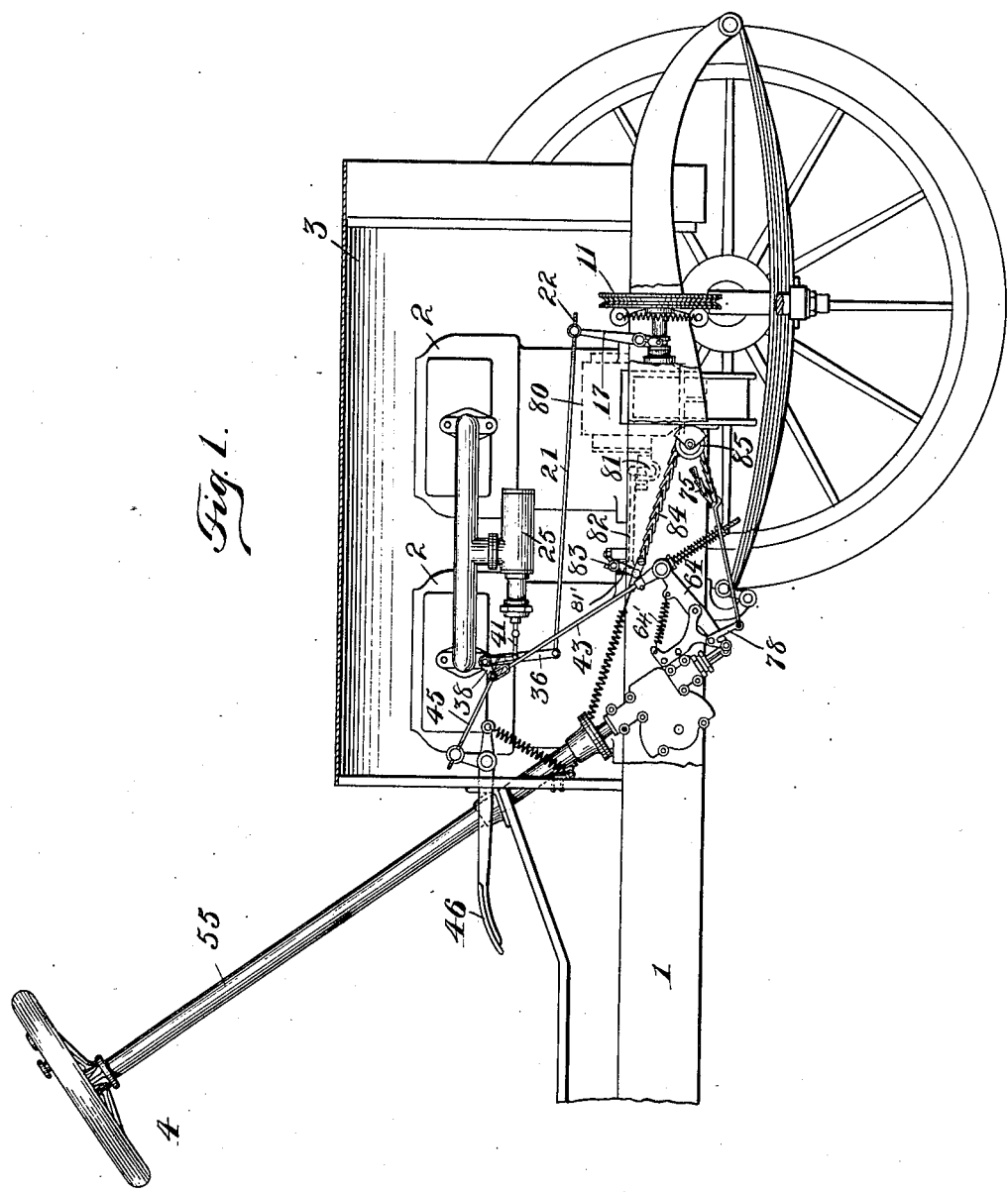
Witnesses
Inventor
Gustave E. Franquist
By his Attorneys
Rosenbaum & Stockbridge No. 825,531. PATENTED JULY 10, 1906.
G. E. FRANQUIST.
CONTROLLER FOR MOTOR VEHICLES.
APPLICATION FILED MAY 26, 1905.
4 SHEETS—SHEET 2.
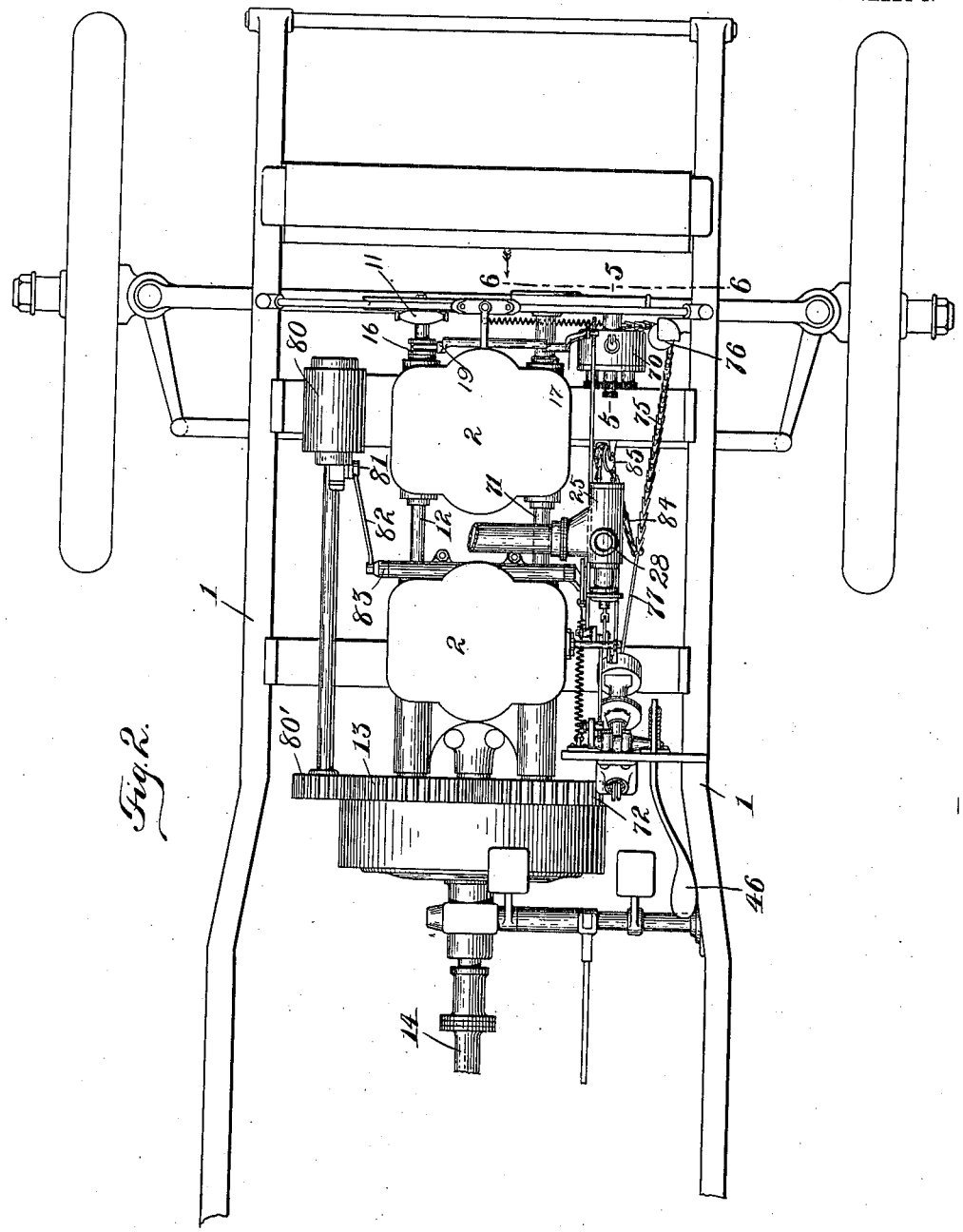
Witnesses
Inventor
Gustav E. Franquist
By his Attorneys
Rosenbaum & Stockbridge

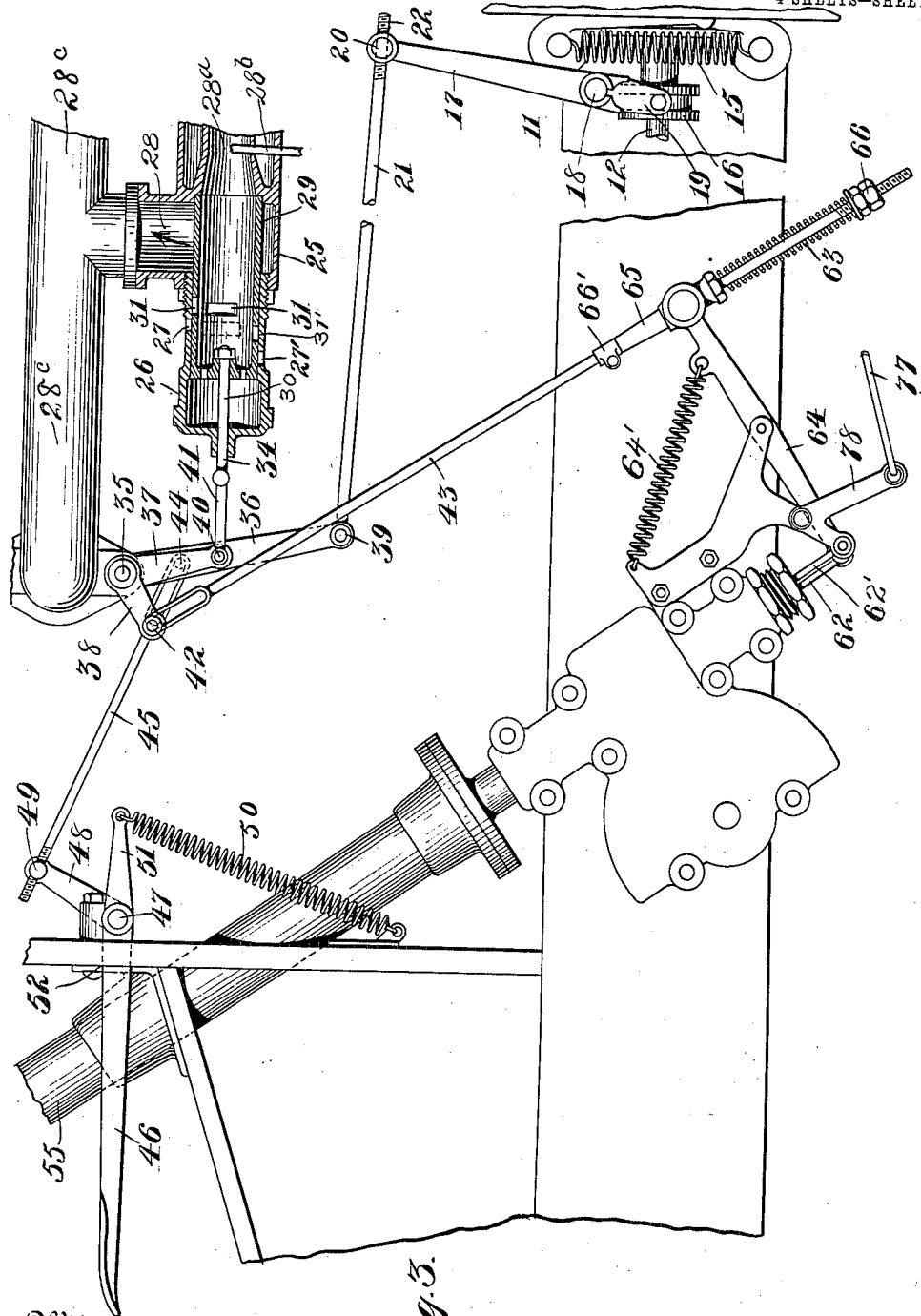

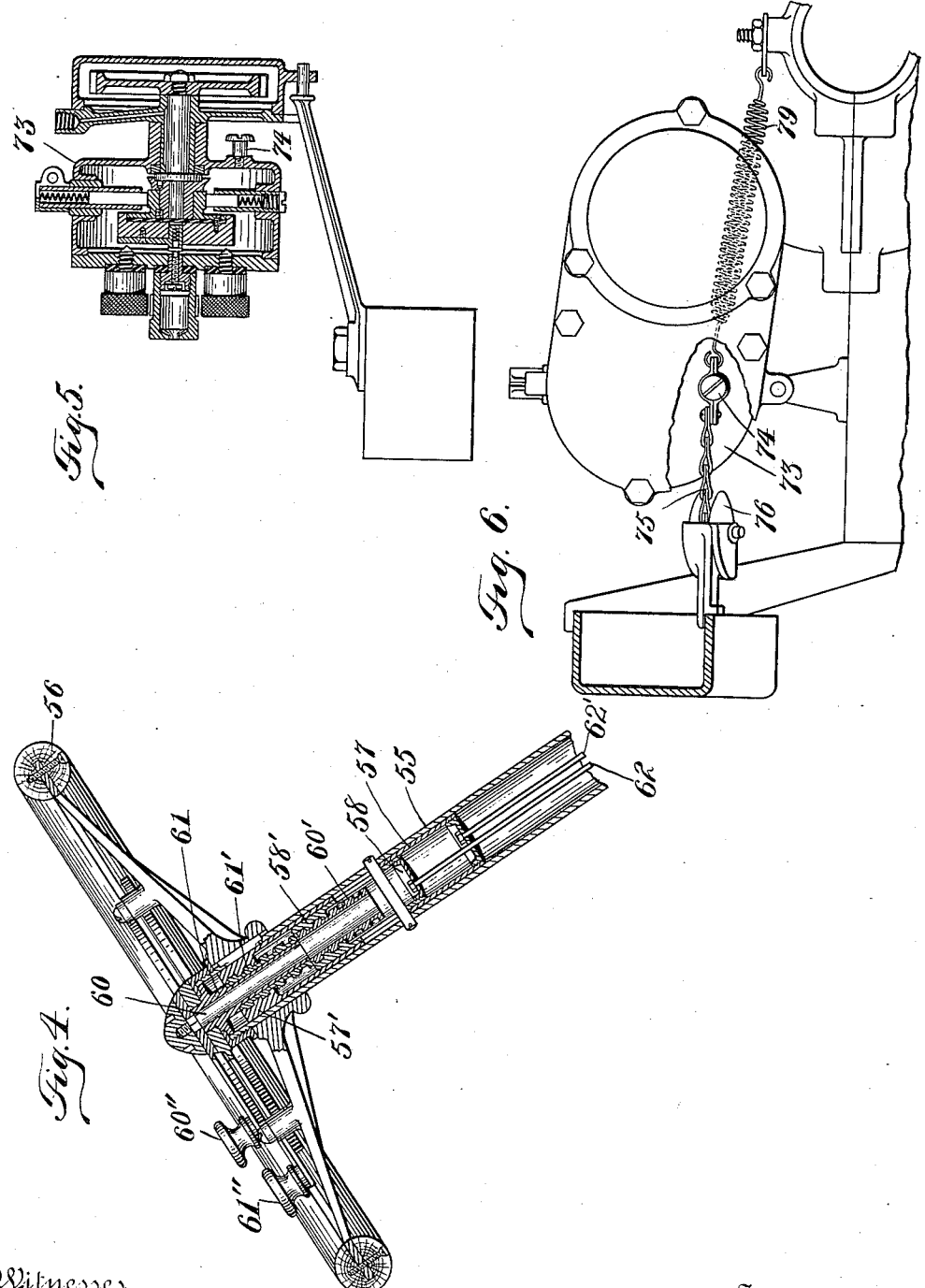

UNITED STATES PATENT OFFICE.

GUSTAVE E. FRANQUIST, OF NEW YORK, N. Y.

CONTROLLER FOR MOTOR-VEHICLES.

No. 825,531.  Specification of Letters Patent.  Patented July 10, 1906.

Application filed May 26, 1905. Serial No. 262,422.

*To all whom it may concern:*

Be it known that I, GUSTAVE E. FRANQUIST, a citizen of the United States, residing at the city of New York, in the borough of Manhattan and State of New York, have invented certain new and useful Improvements in Controllers for Motor-Vehicles, of which the following is a full, clear, and exact description.

My invention relates to controllers for motor-vehicles.

In apparatus of this class it is desirable to provide means for automatically regulating the speed of the vehicle whereby the same may be maintained at any fixed rate regardless of the road, grade, or other conditions. At the same time it is desirable to have connections by which the governor can be set or adjusted to act at different speeds, so that the vehicle may be maintained at a low or a high rate of speed entirely automatically for any distance, as desired. It is furthermore important to provide independent means for disconnecting the governor and controlling the speed entirely at will.

I am aware that speed-governors have been applied in various ways to motor-vehicles to control their movement; but the objection to the ordinary governor is that when once set to act at any given velocity it is constant for that velocity and cannot be conveniently manipulated to vary its adjustment. It is one of the objects of my invention to overcome this defect. To make the governor adjustable, however, presents serious difficulties, since this is a delicate instrument to balance, and any backlash or loose connection between the parts is fatal to its accuracy. The desideratum to be attained, therefore, is a governor of the usual form, of which types having high efficiency are readily obtainable, and combined with this to have independent devices for its adjustment so disposed as to insure against any backlash or loose connection of the parts.

The purpose of my invention is to provide a simple, compact, convenient, and inexpensive construction by which the foregoing objects may be attained.

A further object of the invention is to permit the adjustable part of the mechanism to be wholly disconnected at any time, so that the governor can be free to act in its usual way unencumbered by any auxiliary mechanism for its adjustment.

A further object of the invention is to have this adjustable connection located on the steering-wheel or head, which is itself movable, necessitating special design of the parts in order that its movement may not influence the engine-control and conversely.

A further object of the invention is to have the structure such that the timing means of the engine may be controlled, as well as the speed-governor, from the steering-head and to provide a foot-pedal for letting out the vehicle to its top speed.

With these and other objects in view my invention consists in the construction, combination, location, and arrangement of parts, as will be more fully hereinafter set forth, as shown in the accompanying drawings, and finally pointed out in the appended claims.

Figure 1 is a longitudinal sectional view of a portion of a motor-vehicle having a construction of controlling means embodying the principles of my invention. Fig. 2 is a top plan view of the same part of the inlet-pipe, the engine being removed for the purpose of clearness. Fig. 3 is a detail side elevation, partly in section, showing more clearly the structure of some of the parts illustrated in Fig. 1. Fig. 4 is a detail longitudinal sectional view of the steering gear or wheel. Fig. 5 is a longitudinal sectional view of the commutator, said section being taken on the line 5 5 of Fig. 2; and Fig. 6 is a view taken on the section-line 6 6 of Fig. 2 looking in the direction of the arrows, certain parts being broken away.

Referring now to the figures of the drawings and to the various reference-signs thereon, in which like signs represent like parts in the different views, 1 denotes a motor-vehicle chassis having the usual hydrocarbon-engines 2 2 beneath the usual bonnet 3 at the forward end thereof. 4 denotes the usual steering gear or head, which may comprise a wheel or lever or any other desired form of steering connection. The engines or motors 2 2 are geared to the driving-wheels of the motor-vehicle in the usual manner, which forms no part of my present invention. It is obvious that the invention may be embodied in widely-varying forms of vehicle and that various constructions of motor and driving and steering parts may be used. All these features may be varied to suit the different conditions which may arise in practice and the particular taste or view of any particular designer.

My invention lies in the motor-regulating parts which I will now fully and particularly set forth.

11 denotes, broadly, a speed-governor of any desired form. I have shown a convenient construction of speed-governor, which is mounted upon an auxiliary shaft 12, operatively connected by a gear 13 with a gear (not shown) upon the main driving-shaft 14 of the engine.

15 denotes the tension-spring of the speed-governor, said tension-spring being so mounted as to normally press a collar 16, which is loosely sleeved upon the shaft 12, toward its right-hand position. The usual weights which form a part of the speed-governor act by centrifugal force in opposition to the spring 15 and tend to press the collar 16 to the left in opposition to said spring when the governor is rotated.

17 denotes a lever fulcrumed upon the stud 18 and having a forked arm 19, arranged to embrace the collar 16, whereby the lever is oscillated when said collar is moved endwise upon its shaft. The lever 17 is pivotally connected, as at 20, with a link 21, which connection may be made adjustable by screw-threading said link, as at 22. This link 21 constitutes a portion of the connection for operating the engine-valve.

It is to be understood that the above-described form of speed-governor and connections thereof is merely an illustrative form of my embodiment of my invention, and it is obvious that any other form of governor and connections may be substituted therefor without varying from the spirit and scope of my invention.

In operative relation to the connection 21 I have provided means for controlling the valve or regulating means of the vehicle-motor. I have shown in the drawings a form of motor-regulating means comprising a valve (broadly designated as 25) which controls the air-inlet of the hydrocarbon-motor illustrated in the figures. It will be understood that the ordinary hydrocarbon-motor may be regulated by throttling the mixture or charge, whereby a smaller charge passes into the engine. The valve illustrated in the drawings is of the type known as a "piston-valve" and comprises a casing or cylinder 26, having ports 27, 27', and 28. The piston or valve member 29 is moved to and fro within its containing-walls by the piston-rod 30. The air is drawn through the inlet 28ª by the suction of the engine through the pipe 28 and through additional pipes 28ᶜ, leading to the inlet-valves of the engine to a varying degree, depending on the amount to which the valve 29 is opened.

28ᵇ indicates the oil-nozzle leading from any suitable source, (not shown,) over the surface of which the air rushes, so as to become carbureted by the oil aspirated from such nozzle. When the valve 29 is opened only a short distance, all the air is supplied from the pipe 28ª; but when it is drawn more fully out its openings 31 and 31' register with the openings 27 and 27' in the cylinder-walls to a varying degree, so that air is admitted therethrough. This air mixes with the carbureted air from the pipe 28ª. These features of the carbureter are presented more fully in my companion application, Serial No. 273,719, and need not, therefore, be repeated in greater detail here.

I provide means of connection between the link 21 and the piston-rod 30.

35 denotes a rock-shaft journaled in any stationary part of the frame, and upon this rock-shaft are fixed rock-arms 36, 37, and 38, moving rigidly together on their pivot-shaft, the rock-arm 36 being connected to the link 21, before mentioned, through the pivot 39, and the rock-arm 37 being connected at 40, through an intermediate link 41 to the piston-rod 30, before mentioned. The arm 38 is provided with a pin 42, adapted to engage a slotted link 43, the purpose of which will be later explained. I have also shown a pin 44 upon the arm 36, which is adapted to engage a slotted link 45.

It is clear that the particular arrangement of the various lever-arms may be modified in various ways and still fall within my invention, and I do not desire to be limited or restricted to the particular construction shown.

The link 45 is operatively connected to any form of operating means, whereby said link may be drawn outward when desired. I have shown a convenient construction in which a foot-pedal 46, pivoted at 47, is connected by an arm 48 and pivot 49 with said link 45. A spring 50, acting upon an arm 51, exerts a tension to normally hold the pedal 46 in raised position against a stop 52 upon the frame. It will be apparent that when the pedal 46 is depressed the lever is thrown outward for a purpose which will be later explained.

The link 43, before mentioned, is connected to any suitable means whereby the same can be put under an adjustable spring-tension, and it is desirable, as above pointed out, that a connection be made to the steering gear or head, so that such adjustment may be varied by means within easy reach of the operator. A convenient construction for this purpose is illustrated in the drawings, in which 55 (see particularly Fig. 4) indicates the shaft of the steering-wheel 56. This shaft is made in tubular form in such a way that two casings 57 and 58 may slide telescopically within the same, the casing 58 sliding within the casing 57. Each of these casings, which I shall term "worm-casings," is provided with an interior or female thread 57' and 58', the thread 57' being upon the casing 57 and the thread 58' being upon the casing 58. Within the tubular shaft 55 I have mounted a regulating-spindle 60, which is provided with a worm-thread 60', engaging the thread 58', before mentioned. Upon the spindle 60 is rotatably supported a regulating-sleeve 61, which has a worm-thread 61,' threaded to engage the thread 57', before mentioned. The spindle 60 and the sleeve 61 are provided with regulating-cranks 60'' and 61'', respectively, by which said spindle and sleeve may be set to any desired adjustment. It will be apparent that when said parts are rotatably adjusted the worm-sleeves 57' and 58' will be moved independently of one another longitudinally of the shaft 55 and may be maintained therein at any desired relation.

To the sleeve 58 is connected a rod 62, which extends downward through the shaft 55 and projects at the bottom thereof, as may be seen by reference to Fig. 3. The sleeve 57 has connected thereto a rod 62', which is likewise shown in Fig. 3. These rods form a part of the motor-controlling device which embodies the principle of my invention and are connected to the engine parts in a manner which will now be described. It is merely essential that these rods be capable of adjustment within the shaft of the steering-head, and it is to be understood that the particular construction of the sleeve, &c., within said shaft are merely a form which I have found to be a practicable construction in actual use. The rod 62 is operatively connected to a spring 63 in such a way as to adjust the tension of the same, and for this purpose the rod 62 is shown in the drawings connected to a lever 64, having a sleeve 65 pivoted thereon, which slidably surrounds the link 43, before mentioned. 64' is a spring for counteracting backlash. 66 denotes a nut or collar upon said link 43, which may be adjusted in any convenient way. The spring 63 is disposed between the sleeve 65 and the collar 66, whereby as the rod 62 is adjusted the spring, and thereby the link 43, is put under greater or less tension, as required. 66' denotes a second collar upon the link 43, so disposed that when the sleeve 65 is raised to its upper position it will contact with the collar and raise the link 43 positively. Under these circumstances the pin 42 has free play in the slot 43' of the link 43, and said link is thereby operatively disconnected from the valve-controlling mechanism.

The rod 62' is connected in any suitable way to means for operating the commutator or "timer" of the engine. Referring to Fig. 2, I have illustrated a commutator (broadly designated as 70) which is operated from an auxiliary shaft 71, geared at 72 to the main driving-shaft of the engine. This commutator is used in connection with the usual battery and may be of any suitable form having a casing 73, which contains the usual contacts by which the ignition-circuits are made and broken by the rotating part. This casing 73 is normally stationary, but may be rotatably adjusted by a pin 74, to which I have shown connected a chain 75, running over a pulley 76 and attached to a link 77, which is operated from a bell-crank 78, attached to the rod 62', before mentioned. When, therefore, the position of the rod 62' is varied, the link 77 and chain 75 are operated and the position of the casing 73 correspondingly changed. A spring 79 is shown for the purpose of returning the casing and maintaining the chain 75 in taut relation. As will be well understood by those skilled in the art the effect of adjusting the casing is to throw the spark backward or forward with respect to the engine-cycle for each of the cylinders, whereby the time of the spark may be adjusted for the particualr speed at which the vehicle is operating.

In addition to the battery with its commutator, above described, I provide a magneto-igniter, (indicated in the drawings at 80,) geared to the main driving means at 80' and which also has a commutator whose timing period is adjustable through any suitable mechanism—as, for example, a worm and pinion (not shown) on a rock-shaft 81. The rock-shaft 81 has a link connection 82 with a rock-shaft 83, extending across the vehicle-frame. A chain connection 84 around a pulley 85 is shown connected to an arm 81' on rock-shaft 83 and joined to the pull-rod 77, previously described. By this means when the rod 77 is pulled the timing period of the magneto-commutator is shifted at the same time as that of the battery. Both are adapted to simultaneously furnish the ignition-spark, and either may be open-circuited and cut out of action by suitable switches upon the operating-board, as desired.

The operaton of the invention will be understood from the preceding description. It will be seen that the governor-spring 15 is normally effective to push the link 21 toward the left and open the valve 25 through the intermediate rocking-levers 36 37. When, however, the speed arises to a predetermined amount, the centrifugal force of the usual governor-weights becomes sufficient to overbalance the spring 15 and the link 21 is drawn to the right, thereby closing the valve 25 and restricting the speed in the usual way. It is obvious that for a given tension of the spring 15 there will be a certain speed at which the weights will overbalance such tension, and it is at this speed that the vehicle will be maintained in the absence of any other device by which the point of the governor operation may be varied. By my invention, however, the effective pressure of the governor-spring is varied, so that the governor will operate at different speeds according to adjustment. The spring 63 accomplishes the function through the link 43 and bell-cranks 38 36, the effect of said spring 63 being to oppose the spring 15 and subtract a part of the effective pressure of the same. Inasmuch as the tension of the spring 63 is made adjustable from the steering-head by the crank 60", as above explained, the amount of spring opposition to the main governor-spring 15 is varied, and the effective pressure of such governor-spring is adjusted to any desired amount. Accordingly the speed of the vehicle may be set to be maintained at any desired amount over any conditions of road which may occur by manipulating the crank 60" upon the steering head or gear. If for any reason a high speed is suddenly demanded, this may be readily obtained by depressing the pedal 46, which at once draws the valve to its wide-open position. The normal operation of the valve-controlling means is not interferred with by this last-named mechanism on account of the slotted-link connection 45. In like manner the slotted connection of the link 43 with the arm 38 permits its connected regulating means to be operatively disengaged from the valve-controller, under which circumstances the vehicle will be maintained at the speed to which the governor was originally set to maintain the vehicle. Of course the governor-spring 15 can be constructed in any desired way and can be made independently adjustable by any suitable means.

While I have described various constructions embodying the members of my invention, I do not desire to be limited or restricted thereto, since it is obvious that the invention may be embodied in many widely-varying forms of particular construction. The invention is limited, for example, to motor-vehicles of the hydrocarbon type, since it is obvious it would be applicable to an electric vehicle by substituting the usual electric controller or rheostat in place of the valve 25. In like manner the form of the invention would be varied to accord with the particular design of motor-vehicle to which it was applied.

What I claim is—

In a system of control for motor-vehicles, an engine, a valve arranged to control its speed, a governor connected to said valve, a link normally spring tensioned and connected to said valve to influence the action of said governor, means for withdrawing the influence of said link, a foot-pedal, and means whereby the governor is wholly thrown out of operative relation by said foot-pedal.

In witness whereof I subscribe my signature in the presence of two witnesses.

GUSTAVE E. FRANQUIST.

Witnesses:
 FRANK S. OBER,
 WALDO M. CHAPIN.